(12) United States Patent
Kakuma et al.

(10) Patent No.: US 7,872,858 B2
(45) Date of Patent: Jan. 18, 2011

(54) METHOD FOR MANUFACTURING ELECTROLYTIC CAPACITOR AND ELECTROLYTIC CAPACITOR

(75) Inventors: Kenji Kakuma, Shimane (JP); Masakazu Hosogi, Shimane (JP)

(73) Assignees: Sanyo Electric Co., Ltd., Moriguchi-shi (JP); Sun Electronic Industries Corp., Shijyonawate-shi (JP)

(*) Notice: Subject to any disclaimer, the term of this patent is extended or adjusted under 35 U.S.C. 154(b) by 406 days.

(21) Appl. No.: 12/168,489

(22) Filed: Jul. 7, 2008

(65) Prior Publication Data

US 2009/0021893 A1 Jan. 22, 2009

(30) Foreign Application Priority Data

Jul. 9, 2007 (JP) .............................. 2007-180383

(51) Int. Cl.
*H01G 9/00* (2006.01)

(52) U.S. Cl. .................. 361/523; 361/525; 361/528; 361/529; 361/517; 361/519

(58) Field of Classification Search .............. 361/523, 361/516–519, 525, 528–529, 540–541; 29/25.01, 29/25.03

See application file for complete search history.

(56) References Cited

U.S. PATENT DOCUMENTS

| | | | |
|---|---|---|---|
| 4,910,645 A | 3/1990 | Jonas et al. | |
| 5,455,736 A | 10/1995 | Nishiyama et al. | |
| 5,586,000 A | 12/1996 | Sakata et al. | |
| 6,519,137 B1 * | 2/2003 | Nitta et al. | 361/525 |
| 6,602,741 B1 * | 8/2003 | Kudoh et al. | 438/141 |
| 6,962,612 B1 * | 11/2005 | Saito et al. | 29/25.03 |
| 7,289,313 B2 * | 10/2007 | Takeda et al. | 361/523 |
| 7,388,740 B2 * | 6/2008 | Ro et al. | 361/523 |
| 2006/0047030 A1 | 3/2006 | Yoshida et al. | |
| 2006/0236531 A1 | 10/2006 | Merker et al. | |
| 2008/0002334 A1 | 1/2008 | Kakuma et al. | |

FOREIGN PATENT DOCUMENTS

| | | |
|---|---|---|
| JP | 62-47105 A | 2/1987 |
| JP | 2-39413 A | 2/1990 |
| JP | 7-122464 A | 5/1995 |
| JP | 7-235455 A | 9/1995 |
| JP | 11-186110 A | 7/1999 |
| JP | 3040113 B2 | 3/2000 |
| JP | 2003-109850 A | 4/2003 |
| JP | 2006-100774 A | 4/2006 |
| JP | 2006-295184 A | 10/2006 |
| JP | 2008-10657 A | 1/2008 |

OTHER PUBLICATIONS

Explanation of Relevance for cited Foreign Patent Documents.

* cited by examiner

*Primary Examiner*—Nguyen T Ha
(74) *Attorney, Agent, or Firm*—Westerman, Hattori, Daniels & Adrian, LLP

(57) ABSTRACT

A method for manufacturing an electrolytic capacitor comprising the steps of: forming a capacitor element having a pair of electrode foils wound with a separator interposed therebetween; impregnating the capacitor element with a dispersion solution containing particles of an electrically conductive solid or aggregates thereof and a solvent to form a planar electrically conductive solid layer having the particles of the electrically conductive solid or the aggregates thereof on the surfaces of the electrode foils and the separator; and impregnating the capacitor element having the electrically conductive solid layer with an electrolytic solution.

17 Claims, 4 Drawing Sheets

PRIOR ART

METHOD FOR MANUFACTURING ELECTROLYTIC CAPACITOR AND ELECTROLYTIC CAPACITOR

BACKGROUND OF THE INVENTION

1. Field of the Invention

The present invention relates to an electrolytic capacitor. More particularly, the present invention relates to an electrolytic capacitor including a capacitor element having a pair of electrode foils wound with a separator interposed therebetween.

2. Description of the Related Art

As digitization of electronic equipment proceeds, it has become required that capacitors used therefor have a smaller size, a larger capacitance and a lower Equivalent Series Resistance (hereinafter, referred to as "ESR") in a high-frequency range.

In order to reduce the ESR in a high frequency range, a solid electrolytic capacitor using, an electrically conductive material such as an electrically conductive polymer containing polypyrrole, polythiophene, and derivatives thereof as an electrolyte with higher electric conductivity than that of a conventional driving electrolytic solution has been known (see, for example, Japanese Examined Patent Publication No. 3040113).

Further, in terms of an increase in the capacitance, a wound solid electrolytic capacitor having a configuration in which a capacitor element having an anode foil and a cathode foil wound with a separator interposed therebetween is filled with an electrically conductive solid layer containing the above-described electrically conductive solid polymer has been commercialized.

However, with respect to the conventional wound solid electrolytic capacitor, since an electrically conductive solid polymer having low repairability of a dielectric layer as an electrolyte is employed, there is not only a tendency to decrease the withstand voltage and increase the leak current but also a tendency to cause a short circuit, and the like, along with an increase in the sudden leak current and damage of the dielectric layer during the use.

Therefore, a wound solid electrolytic capacitor, in which a capacitor element contains both of an electrically conductive solid layer containing an electrically conductive solid polymer and an electrolytic solution, has been proposed (see, for example, Japanese Unexamined Patent Publication No. 2006-100774).

The conventional electrically conductive solid layer containing the electrically conductive polymer in the capacitor element is produced in the following manner. First, an anode foil having a dielectric layer thereon and a cathode foil are wound with a separator interposed therebetween to form a capacitor element. Next, this capacitor element is impregnated with a polymerization solution containing a polymerizable monomer such as pyrrole, thiophene, and derivatives thereof, an oxidizing agent such as ammonium persulfate, and sodium persulfate, and a doping agent such as naphthalenesulfonic acid. Then, the above-mentioned polymerizable monomer is oxidatively polymerized in the inside of the capacitor element to form the electrically conductive solid layer.

However, the inventors of the present invention have made studies, and thus have found that since in the method of forming an electrically conductive solid layer in the inside of a capacitor element by polymerization reaction, as described above, the oxidizing agent adheres on the anode foil to perform oxidative polymerization on the dielectric layer, the dielectric layer on the anode foil is easily damaged and the electrically conductive solid layer tends to be formed unevenly on the surfaces of the electrode foils and the separator. As a result, there are problems of inferiority in the solder heat resistance in the mounting process and considerable deterioration of the capacitor properties in a long time use. Further, the above-mentioned method requires a process of removing the unreacted polymerizable monomers and the oxidizing agent by washing after the oxidative polymerization, and thus there is a problem that the process becomes complicated.

SUMMARY OF THE INVENTION

In order to solve the above-mentioned problems, an object of the present invention is to improve the solder heat resistance and the long life property of an electrolytic capacitor including a capacitor element having a pair of electrode foils wound with a separator interposed therebetween and an electrically conductive solid layer and an electrolytic solution in the capacitor element, and to easily produce the electrolytic capacitor.

According to one aspect of the present invention, there is provided a method for manufacturing an electrolytic capacitor comprising the steps of:

forming a capacitor element having a pair of electrode foils wound with a separator interposed therebetween;

impregnating the capacitor element with a dispersion solution containing particles of an electrically conductive solid or aggregates thereof and a solvent to form a planar electrically conductive solid layer having the particles of the electrically conductive solid or the aggregates thereof on the surfaces of the electrode foils and the separator; and impregnating the capacitor element having the electrically conductive solid layer with an electrolytic solution.

According to another aspect of the present invention, there is provided an electrolytic capacitor comprising:

a capacitor element having a pair of electrode foils wound with a separator interposed therebetween; and a planar electrically conductive solid layer containing particles of an electrically conductive solid or aggregates thereof and an electrolytic solution in the capacitor element, wherein the planar electrically conductive solid layer is formed on the surfaces of the electrode foils and the separator by impregnating the capacitor element with a dispersion solution containing the particles of the electrically conductive solid or the aggregates thereof and a solvent.

Other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

Figure 1:
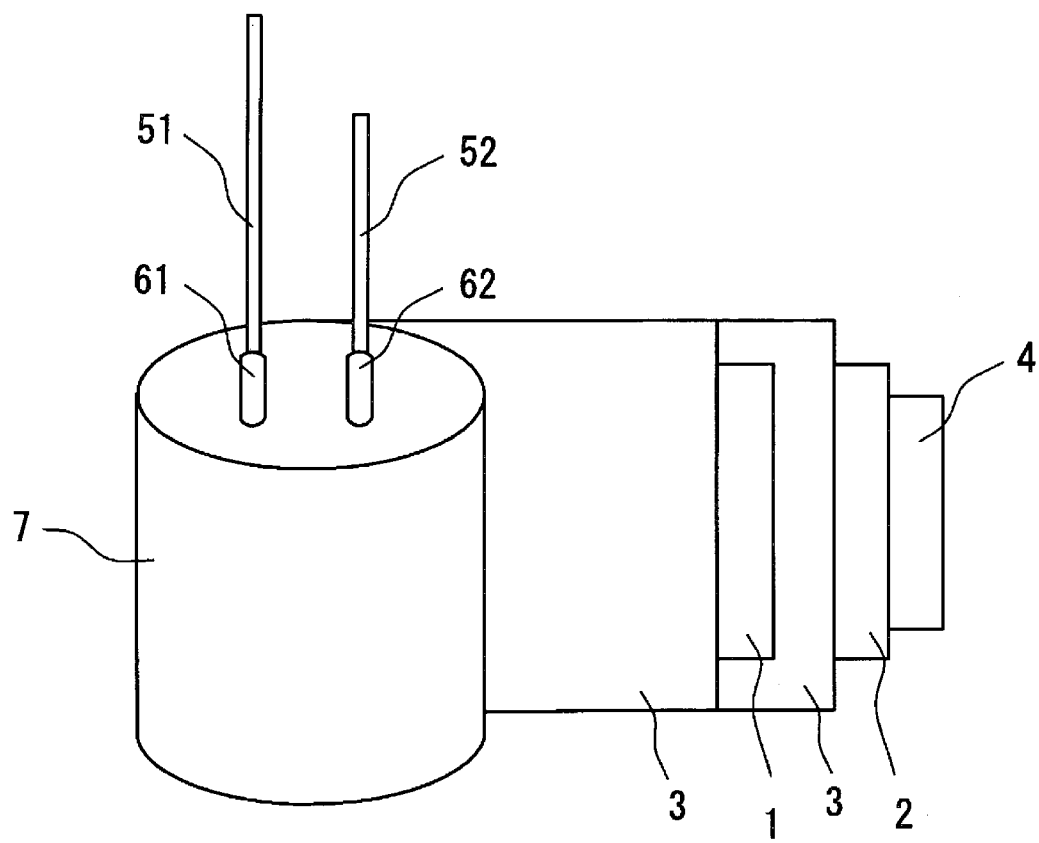
FIG. 1 is a schematic diagram showing one example of a capacitor element according to an embodiment of the present invention.
Figure 2:
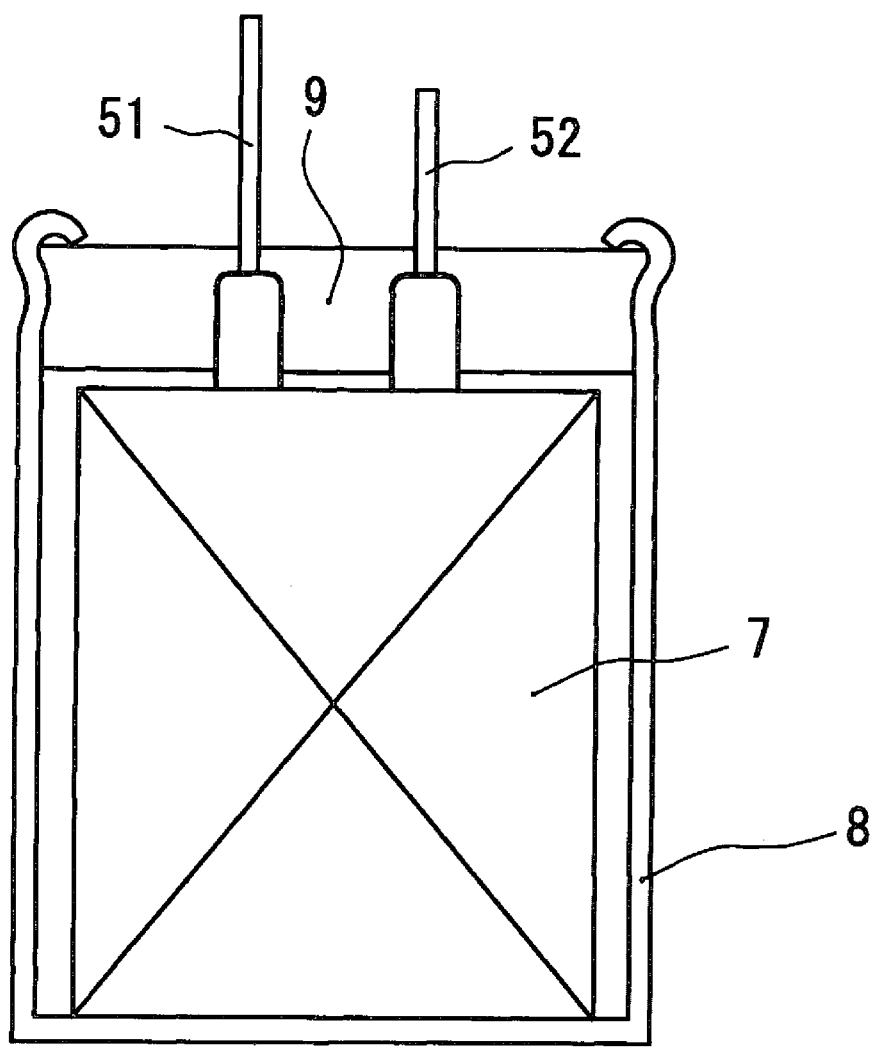
FIG. 2 is a cross-sectional view showing one example of an electrolytic capacitor according to the embodiment of the present invention.

FIG. 1 is a schematic diagram showing one example of a capacitor element according to an embodiment of the present invention, and FIG. 2 is a cross-sectional drawing showing one example of an electrolytic capacitor according to the embodiment of the present invention. Capacitor element 7 is formed by winding an anode foil 1 as described below and an opposite cathode foil 2 with a separator 3 therebetween. This anode foil 1 is a foil which is made of such a valve metal as aluminum, tantalum, niobium or titanium and which undergoes an etching process for roughing the surface and a chemical conversion process for forming the dielectric layer. The foils 1,2 are wound and thereafter fixed by a winding end tape 4. To the anode foil 1 and the opposite cathode foil 2 respectively, leads 51, 52 are attached through lead tabs 61, 62.

In the case of manufacturing the electrolytic capacitor of the present embodiment, the above-mentioned wound capacitor element is impregnated with a dispersion solution containing particles of an electrically conductive solid or aggregates thereof (hereinafter, referred to as "particles or the like") to form a thin planar electrically conductive solid layer containing the particles or the like on the surfaces of the electrode foils and the separators, and then the capacitor element in which the electrically conductive solid layer is formed is impregnated with an electrolytic solution.

Figure 4:
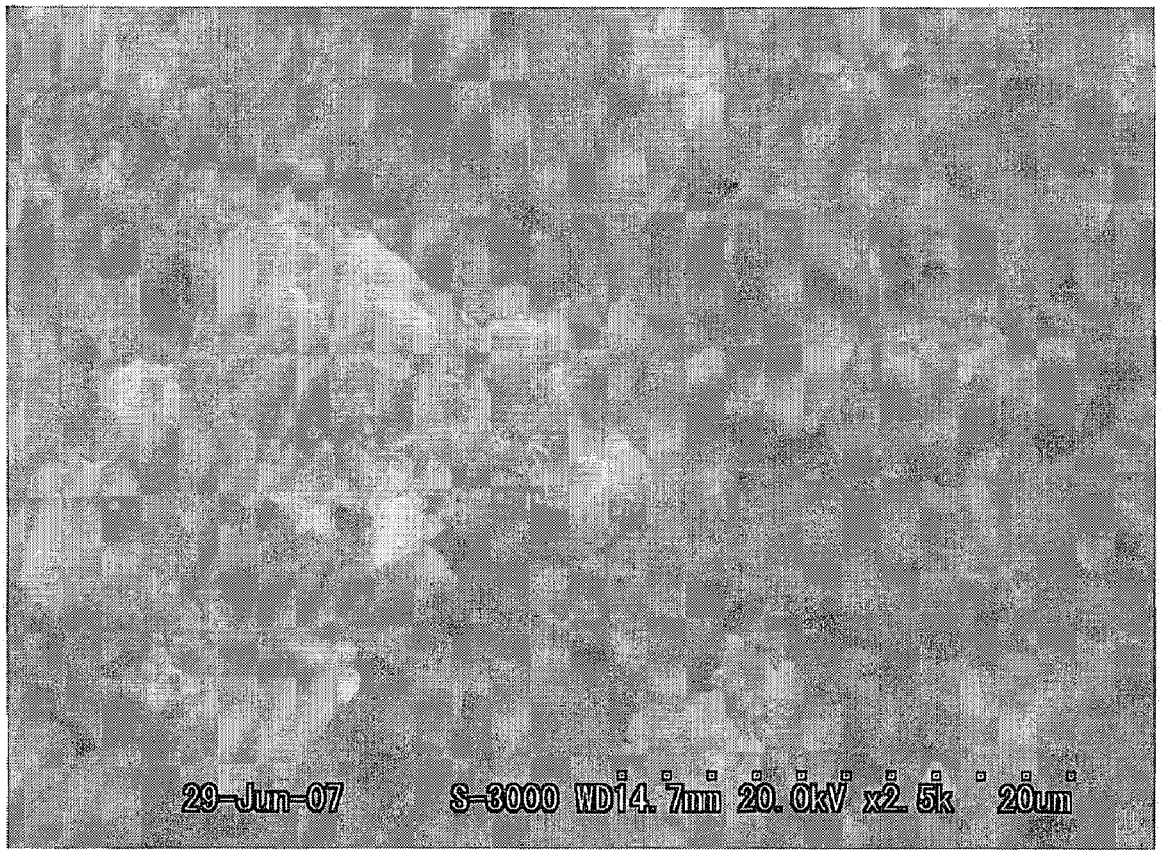
FIG. 4 is a scanning electron microscope photograph showing the surface state of an anode foil, on which an electrically conductive solid layer according to the conventional method.

As described above, an electrically conductive solid layer containing an electrically conductive polymer or the like is excellent in the electric conductivity as compared with an electrolytic solution. However, with respect to a conventional electrolytic capacitor in which an electrically conductive solid layer is formed in a capacitor element by impregnating the capacitor element with a polymerization solution containing a polymerizable monomer, an oxidizing agent, and a dopant agent, damaged portions on a dielectric layer tend to be formed due to the oxidizing agent and polymerization reaction, and the electrically conductive solid layer tends to be formed unevenly on the surface of the electrode foils and the like. FIG. 4 is a photograph taken by a scanning electron microscope, of the surface of an anode foil on which the electrically conductive solid layer is formed by carrying out the oxidative polymerization once in the capacitor element in accordance with a conventional method. As shown in the drawing, it can be found that the electrically conductive solid layer is formed as a sponge-like uneven film on the anode foil. Since an electrically conductive solid layer with a constant thickness has to be formed on the entire surface of the anode foil in order to reduce the ESR, in the case where a production process of forming the above-mentioned electrically conductive solid layer with such unevenness, the oxidative polymerization has to be repeated. As a result, the damaged portions are further increased and partial thickening of the electrically conductive solid layer proceeds. It is supposed that due to occurrence of damaged portions by the oxidative polymerization and uneven coating with a thick electrically conductive solid layer, the damaged portions cannot be completely repaired even by the repair action by an electrolytic solution and thus the capacitor properties are deteriorated at the time of mounting and long time use.

Figure 3:
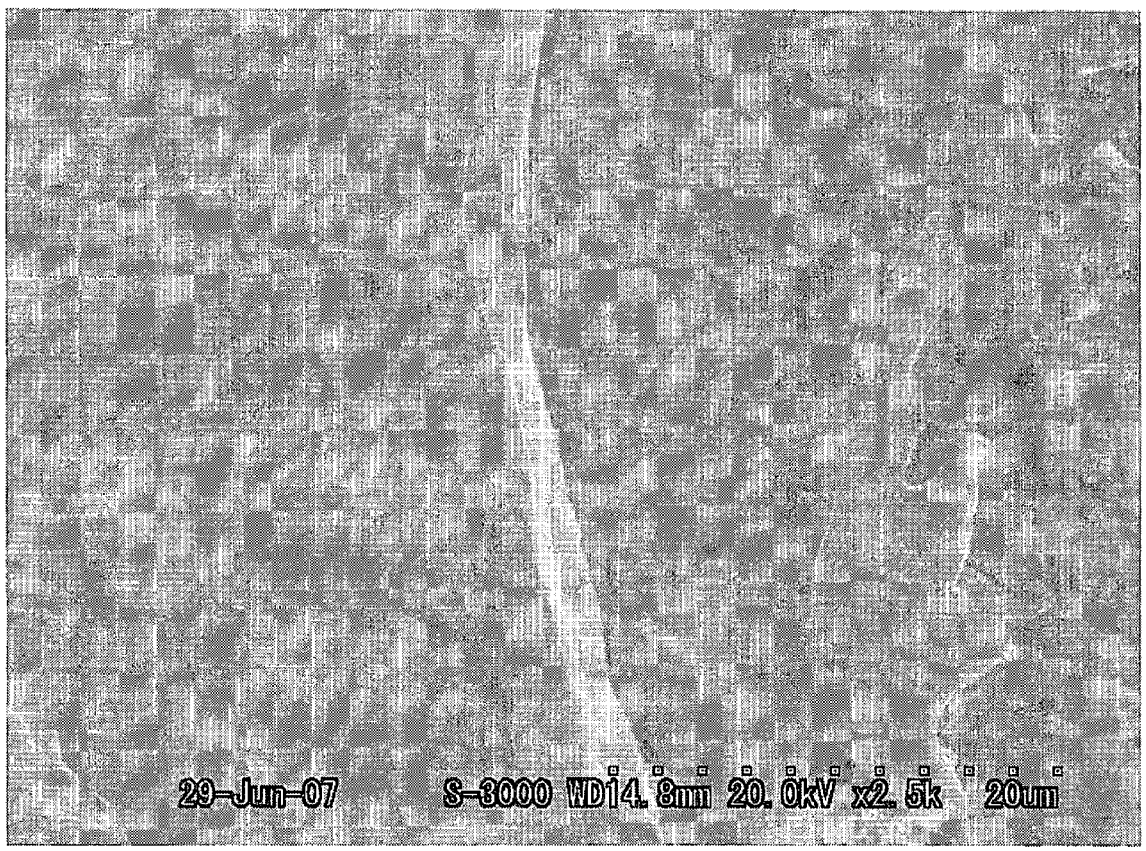
FIG. 3 is a scanning electron microscope photograph showing the surface state of an anode foil, on which an electrically conductive solid layer according to the embodiment of the present invention is formed.

On the other hand, with respect to the electrically conductive solid layer formed by the production method of the embodiment of the present invention, since the capacitor element is impregnated with a dispersion solution containing particles or the like of a previously formed electrically conductive solid, no damaged portion of the dielectric layer is formed by the oxidizing agent or polymerization reaction and the planar electrically conductive solid layer is evenly formed. FIG. 3 is a photograph taken by a scanning electron microscope, of the surface of an anode foil on which the electrically conductive solid layer is formed by the production method of the embodiment of the present invention. As shown in the drawing, it is found that the formed electrically conductive solid layer is evenly formed on the entire surface of the anode foil and that the layer is a planar film. Accordingly, even in the case that a thin electrically conductive solid layer is formed, not only the electric conductivity is sufficiently attained but also the protection action for the dielectric layer is excellent. Therefore, it is made possible to obtain an electrolytic capacitor with low ESR and low leak current. Further, due to the uniform coating of the electrically conductive solid layer, even if damaged portions are formed on the dielectric layer by heat or the like at the time of mounting, the damaged degree is low and the damaged portions can sufficiently be repaired by the repair action by the electrolytic solution. Therefore, deterioration in the capacitor properties such as leak current can be suppressed. Furthermore, since the electrically conductive solid layer is not formed by oxidative polymerization in the capacitor element, the washing and drying processes after the oxidative polymerization can be skipped, and thus the electrolytic capacitor can be produced relatively easily.

In the present embodiment, the amount of the particles or the like of the electrically conductive solid to be introduced into the capacitor element is preferably 5 to 55% by volume with respect to the void volume in the inside of the capacitor element to form the planar electrically conductive solid layer evenly on the entire surface of the electrode foils and the like. If the amount is 5% by volume or more, the electrically conductive solid layer can be formed on the entire surface of the electrode foils and the like with an even thickness, and thus sufficient electric conductivity can be attained. Further, if the amount is 55% by volume or less, the thickness of the electrically conductive solid layer can be suppressed and accordingly, the void volume in the inside of the capacitor element for immersing the electrolytic solution can be surely kept. Therefore, the leak current can be further improved.

In the present embodiment, the thickness of the electrically conductive solid layer is preferably 12.6 μm or less, more preferably 10 μm or less, further more preferably 2 to 10 μm. If the thickness of the electrically conductive solid layer is 12.6 μm or less, preferably 10 μm or less, the cracking of the electrically conductive solid layer can be suppressed and deterioration in the leak current at the time of mounting and long time use can be further suppressed. The amount of the particles or the like of the electrically conductive solid and the thickness of the electrically conductive solid layer can be adjusted in accordance with the concentration of the dispersion solution and the number of times of impregnation.

In the present embodiment, the electrically conductive solid is for example manganese dioxide, 7,7,8,8-tetracyanoquinodimethane (TCNQ), electrically conductive polymer or the like. Among them, the electrically conductive polymer is preferably used. As the electrically conductive polymer, polypyrrole, polythiophene and respective derivatives thereof for example are preferably used because of their high electrical conductivity. Among them, polyethylenedioxythiophene and a derivative thereof are particularly preferable since it has a considerably high electrical conductivity.

A method for forming the particles or the like of the electrically conductive solid containing the electrically conductive polymer is not particularly limited, and examples thereof can include a vapor phase polymerization method, a electrolytic oxidative polymerization method, a chemical oxidative polymerization method, and the like. The electrically conductive solid may be particles and aggregates formed by aggregating the particles. In particular, in the case of particles of an electrically conductive polymer, some particles are aggregated and form aggregates at the time of production or preparation of a dispersion solution.

In the present invention, preferably the solvent in which the electrically conductive solid is dispersed is a solvent in which the solubility of the electrically conductive solid is low or the electrically conductive solid does not dissolve therein. By using such a poor solvent for the electrically conductive solid, the dispersion solution can be obtained in which most of, preferably almost all of the electrically conductive solid does not dissolve. In the cases where the electrically conductive solid is polypyrrole and polythiophene, these electrically conductive polymers do not dissolve in most of solvents and thus the solvent for forming the dispersion solution can be selected from various types of organic and inorganic solvents. In terms of ease of handling and dispersion property of the electrically conductive solid, the solvent for forming the dispersion solution is preferably water or a mixed solvent of water as a main solvent and another solvent.

The concentration of the particles or the like of the electrically conductive solid in the dispersion solution is not limited to a particular one, and is preferably 1 to 30 wt %. If the concentration of the electrically conductive solid is 1 wt % or high, it is possible to introduce sufficient amount of the electrically conductive solid into the capacitor element fewer times. If the concentration is 30 wt % or less, the electrically conductive solid layer can be formed evenly on the surface of the electrode foils and the like. In order to more evenly form the electrically conductive solid layer, it is particularly preferable that the concentration of the particles or the like of the electrically conductive solid in the dispersion solution is 3 to 20 wt %. In the case where the electrically conductive solid contains an electrically conductive polymer, the method of preparing the dispersion solution may be for example (1) a method according to which the electrically conductive polymer is dispersed in the solvent, (2) a method according to which a monomer is polymerized in the solvent to produce the electrically conductive polymer. When the method (2) is used, it is preferable to remove unreacted monomer, impurities and the like after the polymerization reaction.

The method of impregnating the wound capacitor element with the dispersion solution is not limited to a particular one, and any known method is used. In particular, the method according to which the capacitor element is immersed in the dispersion solution is preferably used because of relatively easy operation. The time for immersion depends on the size of the capacitor element and may be a few seconds to a few hours, preferably 1 to 30 minutes. The temperature for immersion is not limited to a particular one and may be 0 to 80° C., preferably 10 to 40° C. The impregnation may be performed under reduced pressure, for example, 30 to 100 kPa, preferably 80 to 100 kPa, for the purpose of accelerating the impregnation and shortening the time for impregnation. In order to further accelerate the impregnation, or to keep the dispersion state of the particles or the like in the dispersion solution uniform, ultrasonic treatment may be carried out while the capacitor element is immersed.

Subsequently, the capacitor element impregnating with the dispersion solution is preferably dried to evaporate the solvent adhered to the capacitor element. Drying can be processed with a conventionally known oven. The drying temperature may be for example 80 to 300° C. In the case where the solvent contains water, the temperature is preferably 100 to 200° C.

The impregnation and drying of the dispersion solution may be repeated a plurality of times so as to form an electrically conductive solid layer with an even thickness. Repeat of the impregnation and drying of the dispersion solution a plurality of times makes it possible to further densely coat the surfaces of the electrode foils and the like with the electrically conductive solid layer containing the particles or the like of the electrically conductive solid, and accordingly to obtain an electrolytic capacitor further excellent in the solder heat resistance and long life property.

Next, the capacitor element in which the electrically conductive solid layer is formed is impregnated with an electrolytic solution. Consequently, the electrolytic solution is filled in the voids of the electrically conductive solid layer containing the particles or the like of the electrically conductive solid introduced into the capacitor element. According to the present embodiment, since the planar electrically conductive solid layer is formed evenly on the surfaces of the electrode foils and the like, not only the protection function for the dielectric layer is excellent but also the impregnating electrolytic solution can be evenly brought into contact with the electrode foils. Therefore, even if damaged portions are formed on the dielectric layer, the repairability of the damaged portions by the electrolytic solution is high and deterioration in the leak current can further be reduced. Namely, since the electrically conductive solid layer does not densely cover the damaged portions of the dielectric layer unevenly, not only can the electrolytic solution cover the dielectric layer but also enter the inside of damaged portions.

As the electrolytic solution, any conventionally known electrolytic solution may be employed. Among them, an electrolytic solution containing an non-aqueous solvent and an organic salt is preferably employed. As the non-aqueous solvent having both of high reliability and a low specific resistance, γ-butyrolactone, sulfolane and a mixture of them are exemplified. As the organic salt, an organic amine salt of an organic amine and an organic acid or an inorganic acid is exemplified. Among organic amine salts, a salt of an organic amine and an organic acid is preferably used, and examples thereof are, for example, triethylamine borodisalicylate, ethyldimethylamine phthalate, mono 1,2,3,4-tetramethylimidazolinium phthalate, mono 1,3-dimethyl-2-ethylimidazolinium phthalate, and a mixture of them. The concentration of the organic salt in the non-aqueous solvent is not limited to a particular concentration, and is preferably 5 to 50 wt %.

The method of impregnating the capacitor element having the electrically conductive solid layer formed therein with the electrolytic solution is not limited to a particular one, and any conventionally known method is employed. In particular, the method according to which the capacitor element is immersed in an electrolytic solution is preferably used because of relatively easy operation. The time for immersion depends on the size of the capacitor element and may be for example one second to a few hours, preferably one to five minutes. The temperature for immersion is not limited to a particular one and may be for example 0 to 80° C., preferably 10 to 40° C. The electrolytic solution impregnation is preferably performed under reduced pressure, for example, 80 to 100 kPa for the purpose of accelerating the impregnation.

After the above-described steps, as shown in FIG. 2, a capacitor element 7 containing the electrically conductive solid layer and the electrolytic solution therein is held in an aluminum casing 8 in the shape of a bottomed cylinder. Next, a rubber packing 9 is attached in the opening of the aluminum casing 8 and drawing and curling processes are performed on the casing. After this, while a rated voltage is applied, an aging process is performed for example at a temperature of approximately 125° C. for approximately one hour, and accordingly the electrolytic capacitor is completed.

In the following, examples and comparative examples are used to describe the present invention in more detail. The present invention, however, is not limited to them.

EXAMPLES

Example 1

An anode foil having a dielectric layer thereon and an opposite cathode foil were wound with a separator interposed therebetween, whereby a capacitor element which had a dimension in the completed state (the outer dimension of the electrolytic capacitor in the state where the capacitor element is housed in an aluminum casing) of diameter 10 mm×height 10.5 mm, and which had a rated voltage of 10 V and a nominal capacitance of 680 μF, was produced. The capacitor element was impregnated with water under reduced pressure for measuring the void volume to find that the void volume was 0.21 mL. Next, the capacitor element produced in the above-mentioned manner was impregnated with a dispersion solution prepared by dispersing polyethylenedioxythiophene particles containing a dopant agent in water (concentration of polyethylenedioxythiophene: 10% by weight), at 25° C. for 1 minute under reduced pressure of 89 kPa. After the impregnation, the capacitor element was taken out of the dispersion solution, put in a drying oven at 125° C. and dried to form an electrically conductive solid layer. Next, the capacitor element in which the electrically conductive solid layer was formed was immersed in a electrolytic solution containing γ-butyrolactone as an non-aqueous solvent and borodisalicylic acid trimethylamine as a solute (concentration of borodisalicylic acid trimethylamine: 18% by weight) at 25° C. for 10 seconds to impregnate the capacitor element with the electrolytic solution.

Then, the capacitor element having the electrically conductive solid layer and the electrolytic solution was housed in an aluminum casing. Successively, a rubber packing was attached to an opening of the aluminum casing and the aluminum casing was processed by drawing and curling. Thereafter, while the voltage 1.15 times as high as the rated voltage was applied, aging was carried out at about 125° C. for about 1 hour to produce an electrolytic capacitor.

Example 2

An electrolytic capacitor was produced in the same manner as in Example 1, except that the impregnation of the capacitor element with the dispersion solution and drying after the impregnation were repeated three times.

Example 3

An electrolytic capacitor was produced in the same manner as in Example 1, except that the impregnation of the capacitor element with the dispersion solution and drying after the impregnation were repeated five times.

Comparative Example 1

A capacitor element having the same rated voltage of 10 V and the same nominal capacitance 680 μF as in Example 1 was immersed in an ethanol solution containing 20% by weight of ethylenedioxythiophene at 25° C. for 10 seconds.

The capacitor element was taken out of the solution and dried at 50° C. for 30 minutes. After the drying, the capacitor element was immersed in an ethanol solution containing 50% by weight of iron p-toluenesulfonate serving as a dopant agent and oxidizing agent, at 25° C. for 3 minutes. The capacitor element was taken out of the solution and left still at 50° C. for 60 minutes to form an electrically conductive solid layer containing polyethylenedioxythiophene. Next, the capacitor element was washed with water for 2 hours to remove impurities and the oxidizing agent, and thereafter the capacitor element was dried at 100° C. for 60 minutes.

Except that the capacitor element having the electrically conductive solid layer containing the polyethylenedioxythiophene produced by the above-mentioned manner was used, an electrolytic capacitor was produced in the same manner as in Example 1 by impregnating the capacitor element with the electrolytic solution and then housing the capacitor element in an aluminum casing.

Comparative Example 2

An electrolytic capacitor was produced in the same manner as in Comparative Example 1, except that the impregnation of the capacitor element with the dispersion solution and drying after the impregnation were repeated two times.

The respective electrolytic capacitors of Examples and Comparative Examples produced in the above-mentioned manner were subjected to the measurements of capacitance (measurement frequency: 120 Hz), ESR (measurement frequency: 100 kHz), tan δ (loss-angle tangent), and leak current. Further, a solder heat resistance test (peak temperature: 265° C., time exposed to 200° C. or more: 70 seconds) was carried out for the respective electrolytic capacitors of Examples and Comparative Examples and after the test, the capacitance, ESR, tan δ, and leak current were measured under the same conditions as described above. Further, a high-temperature load test by applying a rated voltage at 125° C. for 500 hours to the respective electrolytic capacitors of Examples and Comparative Examples was carried out and after the test, the capacitance, ESR, tan δ, and leak current were measured under the same conditions as described above.

The anode foil of each capacitor element in which the electrically conductive solid layer was formed was observed by a scanning electron microscope and the formation state of the electrically conductive solid layer was observed.

The thickness of the electrically conductive solid layer was measured by a microscope manufactured by KEYENCE CORPORATION (VHX-100, high magnification zoom lens: VH-Z450).

In these measurements, since the electrically conductive solid layer formed in the part where the anode foil and the separator were brought into contact with each other was easy to be peeled, the measurements of the formation state and thickness of the above-mentioned electrically conductive solid layer were carried out in the free surface of the anode foil where the contact of the anode foil and the separator was little (a part of the anode foil surface having no direct contact with the separator).

Further, in order to measure the amount of the particles or the like of the electrically conductive solid in the capacitor element, each capacitor element having the electrically conductive solid layer before immersing the electrolytic solution was impregnated with water under reduced pressure. Thereafter, base on the difference of the impregnation amount of water and the above-mentioned void volume, the volume of the formed electrically conductive solid layer was calculated and the volume ratio of the amount of the particles or the like of the electrically conductive solid with respect to the void volume was calculated. Table 1 shows results thereof.

TABLE 1

| | Electrically conductive solid layer | | Amount | Initial stage | | | | After solder heat resistance test | | | | After 5000 Hr at 125° C. | | | |
|---|---|---|---|---|---|---|---|---|---|---|---|---|---|---|---|
| | state | Thickness (μm) | (% by volume) | Capacitance (μF) | tanδ | ESR (mΩ) | Leak current (μA) | Capacitance (μF) | tanδ | ESR (mΩ) | Leak current (μA) | Capacitance (μF) | tanδ | ESR (mΩ) | Leak current (μA) |
| Ex. 1 | Planar | 2.0 | 14.2 | 682.5 | 0.054 | 14.2 | 5.1 | 668.9 | 0.055 | 17.0 | 6.3 | 635.5 | 0.068 | 25.6 | 5.8 |
| Ex. 2 | Planar | 3.4 | 24.3 | 683.5 | 0.056 | 13.8 | 15.7 | 669.7 | 0.058 | 16.7 | 15.8 | 637.3 | 0.071 | 24.8 | 5.2 |
| Ex. 3 | Planar | 4.0 | 30.3 | 682.8 | 0.058 | 13.2 | 35.9 | 668.3 | 0.058 | 15.8 | 40.2 | 640.2 | 0.070 | 23.3 | 5.7 |
| C. Ex. 1 | Sponge-like | 4.0 | 11.8 | 662.8 | 0.085 | 16.3 | 156.2 | 629.7 | 0.093 | 21.2 | 358.6 | 554.3 | 0.123 | 56.8 | 36.5 |
| C. Ex. 2 | Sponge-like | 6.0 | 20.3 | 668.2 | 0.068 | 15.2 | 856.3 | 628.1 | 0.082 | 20.3 | 1002.6 | 532.6 | 0.156 | 58.9 | 103.2 |

As shown in the Table 1, it can be understood that each electrolytic capacitor of Examples having the electrically conductive solid layer formed by impregnating the capacitor element with the dispersion solution prepared by dispersing the particles or the like of the electrically conductive solid was excellent in all of the properties of capacitance, tan δ, ESR, and leak current in the initial stage after production, after the solder heat resistance test, and after the high-temperature load test as compared with the electrolytic capacitors of Comparative Examples produced by the conventional methods. That is, it can be understood that each electrolytic capacitor of Examples, in which a thin planar electrically conductive solid layer containing polyethylenedioxythiophene particles as particles of the electrically conductive solid, was formed on the surfaces of the electrode foils and the separator, had high capacitance and low ESR as compared with the electrolytic capacitors of Comparative Examples. The reason for that is supposedly because the electrically conductive solid layer of each Example was formed on the surfaces of the electrode foils and the like in a coating state more excellent in the conductivity than the electrically conductive solid layer formed by oxidative polymerization in the capacitor element. Further, the leak current of each electrolytic capacitor of Examples after the solder heat resistance test and after the high-temperature load test was remarkably smaller than those of Comparative Examples. The reason for lowered leak current is supposedly attributed to that since any oxidizing agent was not used at the time of forming the electrically conductive solid layer, no damaged portion was formed in the dielectric layer and that further since the electrically conductive solid layer was formed evenly on the surface of the dielectric layer, even if damaged portions were formed in the dielectric layer due to heat or the like, the excellent repair action by the electrolytic solution for the damaged parts was obtained.

On the other hand, each electrolytic capacitor of Comparative Examples in which the electrically conductive solid layer was formed by carrying out the oxidative polymerization in the capacitor element by the conventional method was not only inferior in the properties of the initial stage after the production but also deteriorated significantly in the properties after the solder heat resistance test and the high-temperature load test. The reason for this is supposedly attributed to that the dielectric layer was easily damaged by the oxidizing agent and the polymerization reaction and also that the electrically conductive solid layer coated the electrode foils and the like unevenly in the sponge-like state and therefore the repair action by the electrolytic solution was insufficient. Further, in the case where the number of times of impregnation by the conventional method was increased, while the ESR in the initial stage after production was reduced, the properties such as leak current or the like were considerably deteriorated both after the solid heat resistance test and after the high-temperature load test. The reason for this is supposedly attributed to that the damaged portions of the dielectric layer were increased and the repair action by the electrolytic solution was further deteriorated.

Examples 4-1 to 4-6

A capacitor element having a rated voltage of 35 V and a nominal capacitance 150 μF was produced in the same manner in as Example 1. Electrolytic capacitors having different amounts of the particles or the like of the electrically conductive solid and different thickness of the electrically conductive solid layer as shown in Table 2 were produced by using the above-obtained capacitor element and the same dispersion solution as in Example 1 and changing the number of times of impregnation of the dispersion solution and drying after the impregnation.

The respective electrolytic capacitors of Examples 4-1 to 4-6 produced in the above-mentioned manner were subjected to the measurements of capacitance (measurement frequency: 120 Hz), ESR (measurement frequency: 100 kHz), tan δ (loss-angle tangent), and leak current. Further, a solder heat resistance test (peak temperature: 265° C., time exposed to 200° C. or more: 70 seconds) was carried out for the respective electrolytic capacitors of Examples and after the test, the capacitance, ESR, tan δ, and leak current were measured under the same conditions as described above. Table 2 shows results thereof.

TABLE 2

| | Electrically conductive solid layer | | Amount | Initial stage | | | | After solder heat resistance test | | | |
|---|---|---|---|---|---|---|---|---|---|---|---|
| | state | Thickness (μm) | (% by volume) | Capacitance (μF) | tanδ | ESR (mΩ) | Leak current (μA) | Capacitance (μF) | tanδ | ESR (mΩ) | Leak current (μA) |
| Ex. 4-1 | Planar | 0.7 | 5 | 170.5 | 0.045 | 23.6 | 15.4 | 165.1 | 0.055 | 32.0 | 15.8 |
| Ex. 4-2 | Planar | 2.0 | 15 | 169.8 | 0.039 | 13.0 | 10.0 | 165.1 | 0.039 | 14.9 | 13.0 |

TABLE 2-continued

| | Electrically conductive solid layer | | Amount | Initial stage | | | | After solder heat resistance test | | | |
|---|---|---|---|---|---|---|---|---|---|---|---|
| | state | Thickness (μm) | (% by volume) | Capacitance (μF) | tanδ | ESR (mΩ) | Leak current (μA) | Capacitance (μF) | tanδ | ESR (mΩ) | Leak current (μA) |
| Ex. 4-3 | Planar | 4.0 | 30 | 167.8 | 0.034 | 11.3 | 9.6 | 163.2 | 0.034 | 12.5 | 12.0 |
| Ex. 4-4 | Planar | 6.3 | 38 | 166.3 | 0.036 | 11.3 | 15.4 | 161.5 | 0.037 | 13.9 | 19.7 |
| Ex. 4-5 | Planar | 10.0 | 45 | 165.3 | 0.037 | 11.5 | 11.1 | 160.5 | 0.039 | 14.3 | 12.6 |
| Ex. 4-6 | Planar | 12.6 | 55 | 164.2 | 0.041 | 11.8 | 7.9 | 159.2 | 0.046 | 15.9 | 12.4 |

As shown in Table 2 above, it can be understood that the electrolytic capacitors having an amount of the particles or the like of the electrically conductive solid in a range of 5 to 55% by volume, particularly 5 to 45% by volume; and a thickness of the electrically conductive solid layer 12.6 μm or less, particularly 10 μm or less were scarcely deteriorated in all of the properties after the solder heat resistance test.

As described above in detail, according to one aspect of the present invention, there is provided a method for manufacturing an electrolytic capacitor comprising the steps of:

forming a capacitor element having a pair of electrode foils wound with a separator interposed therebetween;

impregnating the capacitor element with a dispersion solution containing particles of an electrically conductive solid or aggregates thereof and a solvent to form a planar electrically conductive solid layer having the particles of the electrically conductive solid or the aggregates thereof on the surfaces of the electrode foils and the separator; and impregnating the capacitor element having the electrically conductive solid layer with an electrolytic solution.

According to the above method, since the capacitor element is impregnated with a dispersion solution containing particles or the like of a previously formed electrically conductive solid, the planar electrically conductive solid layer is evenly formed on the anode foil or the like as compared with the electrically conductive solid layer formed by oxidative polymerization in the capacitor element in accordance with the conventional method, whereby the high electric conductivity can be obtained. Also, since the electrically conductive solid layer is not produced in the capacitor element, no damaged portion of the dielectric layer is formed by the oxidizing agent or polymerization reaction. Further, since the formed electrically conductive solid layer is evenly formed on the entire surface of the anode foil, the protection function for the dielectric layer is excellent, whereby even if damaged portions are formed in the dielectric layer by heat or the like at the time of mounting, the damaged degree can be suppressed. Furthermore, the planar electrically conductive solid layer can secure high repair action by the electrolytic solution even if damaged portions are formed on the dielectric layer. Namely, with respect to a conventional electrolytic capacitor in which an electrically conductive solid layer is formed in a capacitor element by impregnating the capacitor element with a polymerization solution containing a polymerizable monomer, an oxidizing agent, and a dopant agent, damaged portions on the dielectric layer tend to be formed due to the contact of the oxidizing agent and the dielectric layer at the initial stage of impregnation of the polymerization solution and polymerization reaction at the polymerization step. Also, according to the conventional method, since the electrically conductive solid layer tends to be formed unevenly on the surface of the electrode foils and the separator, the oxidative polymerization has to be repeated to form the electrically conductive solid layer with a constant thickness. As a result, the oxidizing agent is brought into contact with a portion of the dielectric layer not covered by the electrically conductive solid layer, whereby the damaged portions are further increased. Therefore, the damaged portions cannot be completely repaired even by the repair action by the electrolytic solution. On the other hand, according to the above method, since the capacitor element is impregnated with the dispersion solution containing particles or the like of the previously formed electrically conductive solid, no damaged portion of the dielectric layer is formed by the oxidizing agent or polymerization reaction. Also, since the planar electrically conductive solid layer is evenly formed on the entire surface of the dielectric layer, the planar electrically conductive solid layer can protect the dielectric layer, whereby the damaged degree due to heat and the like can be suppressed. Further, since the electrolytic solution can be evenly brought into contact with the electrode foils, the repairability of the damaged portions by the electrolytic solution is high. Furthermore, the above-mentioned electrolytic capacitor can be produced easily since the washing and drying processes after the oxidative polymerization, which are conventionally required, are not necessary.

According to another aspect of the present invention, there is provided an electrolytic capacitor comprising:

a capacitor element having a pair of electrode foils wound with a separator interposed therebetween; and a planar electrically conductive solid layer containing particles of an electrically conductive solid or aggregates thereof and an electrolytic solution in the capacitor element, wherein the planar electrically conductive solid layer is formed on the surfaces of the electrode foils and the separator by impregnating the capacitor element with a dispersion solution containing the particles of the electrically conductive solid or the aggregates thereof and a solvent.

In the conventional method according to which an electrically conductive solid layer is formed by oxidative polymerization in the capacitor element, the electrically conductive solid layer tends to be formed as a sponge-like film in which the electrically conductive polymer partially aggregated. Thus, the electrically conductive solid layer which evenly spreads over the electrode foils and the separator can not be formed, whereby the electric conductivity tends to be lowered. On the other hand, according to the above electrolytic capacitor, since the capacitor element is impregnated with a dispersion solution containing particles or the like of a previously formed electrically conductive solid, the planar electrically conductive solid layer is evenly formed on the surfaces of the electrode foils and the separator. Also, no damaged portion of the dielectric layer is formed by the oxidizing agent or polymerization reaction. Further, it is possible to secure not only high electric conductivity but also excellent protection action for the dielectric layer.

As described above, according to the present invention, an electrolytic capacitor excellent in the solder heat resistance and excellent in the long life property can be produced. Further, according to the present invention, the above-mentioned electrolytic capacitor can be produced easily since the washing and drying processes after the oxidative polymerization, which are conventionally required, are not necessary.

The present application claims a priority based on Japanese Patent Application No. 2007-180383 filed on Jul. 9, 2007, the contents of which are hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. A method for manufacturing an electrolytic capacitor comprising the steps of:
   forming a capacitor element having a pair of electrode foils wound with a separator interposed therebetween;
   impregnating the capacitor element with a dispersion solution containing particles of an electrically conductive solid or aggregates thereof and a solvent to form a planar electrically conductive solid layer having the particles of the electrically conductive solid or the aggregates thereof on the surfaces of the electrode foils and the separator; and
   impregnating the capacitor element having the electrically conductive solid layer with an electrolytic solution.

2. The method for manufacturing an electrolytic capacitor according to claim 1, wherein an amount of the particles of the electrically conductive solid or the aggregates thereof in the capacitor element is 5 to 55% by volume with respect to a void volume in the inside of the capacitor element.

3. The method for manufacturing an electrolytic capacitor according to claim 1, wherein an amount of the particles of the electrically conductive solid or the aggregates thereof in the capacitor element is 5 to 45% by volume with respect to a void volume in the inside of the capacitor element.

4. The method for manufacturing an electrolytic capacitor according to claim 1, wherein the planar electrically conductive solid layer has a thickness of 12.6 μm or less.

5. The method for manufacturing an electrolytic capacitor according to claim 1, wherein the planar electrically conductive solid layer has a thickness of 10 μm or less.

6. The method for manufacturing an electrolytic capacitor according to claim 1, wherein the electrically conductive solid contains at least one selected from the group consisting of polythiophene and a derivative thereof.

7. The method for manufacturing an electrolytic capacitor according to claim 1, wherein the electrolytic solution contains, as an non-aqueous solvent, at least one selected from the group consisting of γ-butyrolactone and sulfolane, and, as a solute, an organic amine salt.

8. The method for manufacturing an electrolytic capacitor according to claim 1, wherein the capacitor element is impregnated with the dispersion solution under reduced pressure.

9. The method for manufacturing an electrolytic capacitor according to claim 1, wherein the capacitor element is impregnated with the dispersion solution while ultrasonic treatment is carried out.

10. A method for manufacturing an electrolytic capacitor comprising the steps of:
    forming a capacitor element having a pair of electrode foils wound with a separator interposed therebetween;
    impregnating the capacitor element with a dispersion solution containing particles of an electrically conductive solid or aggregates thereof and a solvent to form a planar electrically conductive solid layer having the particles of the electrically conductive solid or the aggregates thereof on the surfaces of the electrode foils and the separator, in such a manner that an amount of the particles of the electrically conductive solid or the aggregates thereof in the capacitor element is 5 to 55% by volume with respect to the void volume in the inside of the capacitor element and the planar electrically conductive solid layer has a thickness of 12.6 μm or less; and
    impregnating the capacitor element having the electrically conductive solid layer with an electrolytic solution.

11. An electrolytic capacitor comprising:
    a capacitor element having a pair of electrode foils wound with a separator interposed therebetween; and
    a planar electrically conductive solid layer containing particles of an electrically conductive solid or aggregates thereof and an electrolytic solution in the capacitor element,
    wherein the planar electrically conductive solid layer is formed on the surfaces of the electrode foils and the separator by impregnating the capacitor element with a dispersion solution containing the particles of the electrically conductive solid or the aggregates thereof and a solvent.

12. The electrolytic capacitor according to claim 11, wherein an amount of the particles of the electrically conductive solid or the aggregates thereof in the capacitor element is 5 to 55% by volume with respect to a void volume in the inside of the capacitor element.

13. The electrolytic capacitor according to claim 11, wherein an amount of the particles of the electrically conductive solid or the aggregates thereof in the capacitor element is 5 to 45% by volume with respect to a void volume in the inside of the capacitor element.

14. The electrolytic capacitor according to claim 11, wherein the planar electrically conductive solid layer has a thickness of 12.6 μm or less.

15. The electrolytic capacitor according to claim 11, wherein the planar electrically conductive solid layer has a thickness of 10 μm or less.

16. The electrolytic capacitor according to claim 11, wherein the electrically conductive solid contains at least one selected from the group consisting of polythiophene and a derivative thereof.

17. The electrolytic capacitor according to claim 11, wherein the electrolytic solution contains, as an non-aqueous solvent, at least one selected from the group consisting of γ-butyrolactone and sulfolane, and, as a solute, an organic amine salt.

* * * * *